May 12, 1959 R. S. LONGACRE 2,885,825
SELF-WATERING FLOWER POT ASSEMBLY
Filed July 23, 1957 2 Sheets-Sheet 1

INVENTOR.
RUSSELL S. LONGACRE
BY
ATTORNEY

May 12, 1959
R. S. LONGACRE
2,885,825
SELF-WATERING FLOWER POT ASSEMBLY
Filed July 23, 1957
2 Sheets-Sheet 2
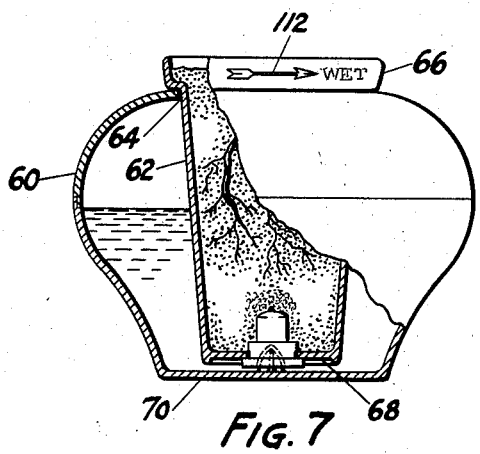
FIG. 7
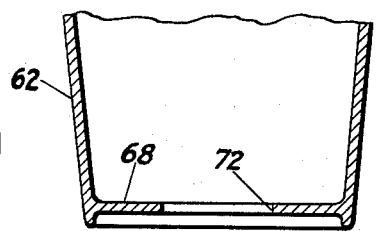
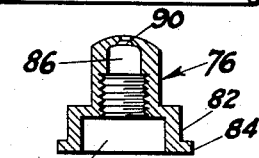
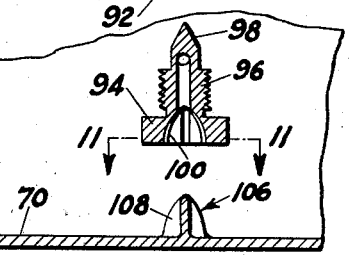
FIG. 8
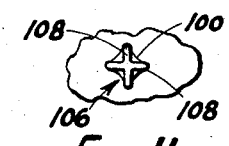
FIG. 10    FIG. 11
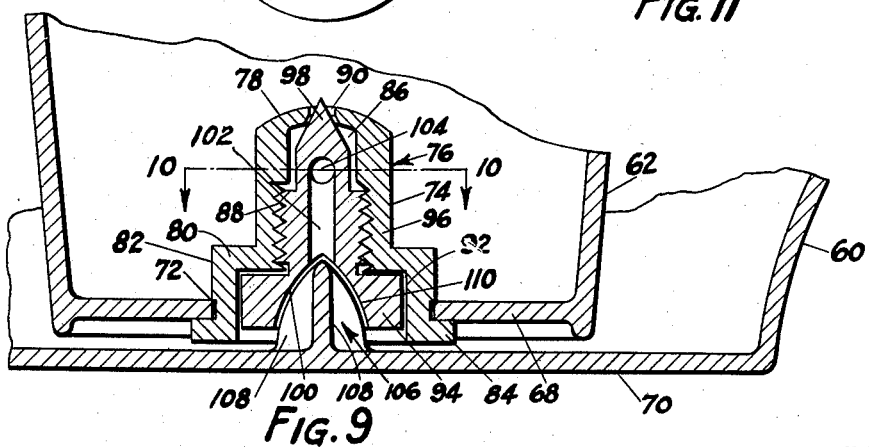
FIG. 9
INVENTOR.
RUSSELL S. LONGACRE
BY
ATTORNEY

United States Patent Office 2,885,825
Patented May 12, 1959

2,885,825

SELF-WATERING FLOWER POT ASSEMBLY

Russell S. Longacre, York, Pa.

Application July 23, 1957, Serial No. 673,644

10 Claims. (Cl. 47—38)

This invention relates to a self-watering flower pot assembly and comprises an improvement over pending application Serial No. 596,360, filed by the same inventor.

The present application comprises a continuation-in-part of application Serial No. 630,216, filed December 24, 1956, now abandoned.

Conventional flower pots, and particularly those used indoors, usually are placed upon a suitable dish or other receptacle. Watering of the plants being grown in the flower pots usually is accomplished by using a watering can or pitcher to pour water into the upper end of the flower pot. This method of watering a plant frequently results in the plant receiving too much water, thus being harmful to the plant.

Such conventional flower pots usually are provided with a hole in the bottom thereof and in order to obviate too much water being placed in the pot such as by watering the same from the top, watering of the plant may be accomplished by placing water in the receptacle upon which the pot is placed, whereby the plant and soil within the pot draw water from the receptacle by capillary attraction.

Especially in regard to raising certain delicate plants such as African violets which flourish best under very restricted watering conditions, even this latter means of watering the plants frequently provides too much water. It is not possible to control the water however in any accurate manner due to the fact that the hole in the bottom of the pot is of fixed dimension and cannot be adjusted in any way.

It is the principal object of the present invention to provide a flower pot assembly comprising an exterior container which serves as a reservoir and an interior flower pot is suspended into said container, the bottom of the flower pot having an adjustable water inlet valve carried thereby, whereby the amount of water to be introduced into the pot may be regulated to a high degree of accuracy, comprising as little as a few drops a day if this amount is all that is required by the plant being grown in the pot.

A further object of the invention is to provide a valve unit which may be manufactured separately from the flower pot assembly and inserted into a hole in the bottom of the flower pot, the valve assembly being in watertight relationship with the pot.

Still another object of the invention is to provide a valve assembly which is readily manufactured by simple and inexpensive means such as molding the same from resinous material, the general characteristics of the valve unit being that of a needle valve which produces a highly accurate means for introducing water into the flower pot from the exterior reservoir containing the water supply.

A still further object of the invention comprises providing, in one embodiment of the invention, means respectively provided on the adjustable valve and exterior container which interengage and permit adjustment of the valve simply by relative movement between the exterior container and interior flower pot, preferably about the vertical axis thereof, whereby adjustment of the valve is achieved without having to remove the interior flower pot from the exterior container.

One of the principal improvements of the present invention over that comprising the subject matter of said co-pending application resides in the provision of a separable valve unit and details of the valve unit per se.

Details of the foregoing objects and of the invention, as well as other objects thereof, are set forth in the following specification and illustrated in the accompanying drawing comprising a part thereof.

Figure 1:
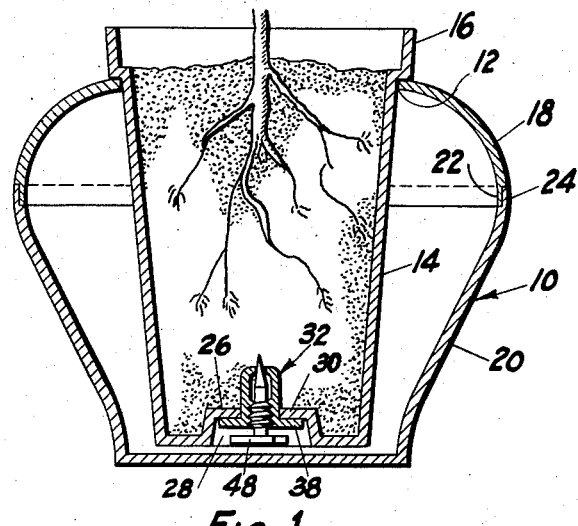
Fig. 1 is a vertical sectional view of a flower pot assembly embodying the principles of the present invention.
Figure 3:
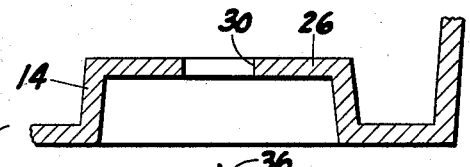

Fig. 3 comprises a fragmentary vertical sectional exploded view, on a scale larger than used in Fig. 1, illustrating details of the valve unit and the portion of the bottom of the flower pot to which said unit is connected.

Figure 4:
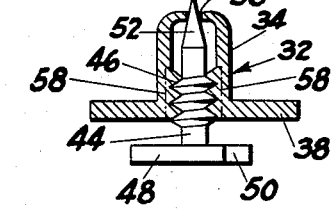

Fig. 4 is a view similar to Fig. 3 but showing the valve unit inserted into the bottom of the flower pot.

Figure 5:
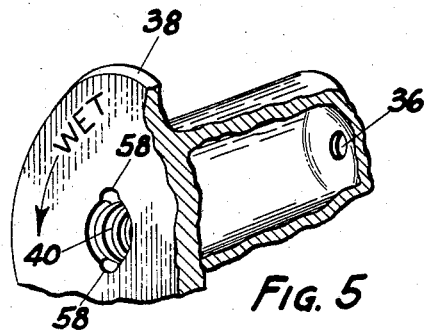

Fig. 5 is a perspective view of the flanged, cylindrical jacket or body of the valve unit per se.

Figure 6:
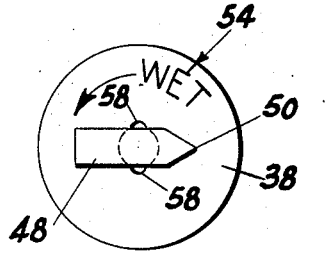

Fig. 6 is a bottom plan view of the valve unit and illustrates the pointer and indicating means by which the setting of the valve readily is determined visually.

Fig. 7 is a view similar to Fig. 1 but showing another embodiment of the invention.

Fig. 8 is an exploded, fragmentary, vertical sectional view, on a larger scale than Fig. 7, showing details of the embodiment of the invention shown in Fig. 7.

Fig. 9 is a fragmentary vertical sectional view of the embodiment shown in Fig. 7 on a still greater scale than in Fig. 8.

Fig. 10 is a sectional plan view taken on the line 10—10 of Fig. 9.

Fig. 11 is a fragmentary plan view taken on the line 11—11 of Fig. 8.

Referring to Fig. 1, in which the flower pot assembly comprising the present invention is illustrated in exemplary manner, said assembly comprises an exterior container 10 having an opening 12 at the upper end thereof. Said container comprises a water reservoir and, under most conditions of use, said reservoir may be filled a certain amount prior to inserting through the opening 12 thereof a flower pot 14 which is suspended by a conventional flange 16 on the flower pot from the upper end of the reservoir container 10.

Figure 2:
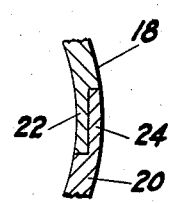
Fig. 2 is a fragmentary vertical elevation of a portion of the exterior container comprising the water reservoir.

If desired, and especially for convenience of manufacture, the exterior container 10 may be bi-partite and comprise an upper portion 18 and a lower portion 20 which, for example, may be separately molded from any suitable material such as synthetic resin, glass, or other ceramic material. The upper and lower portions respectively may be provided with overlapped flanges 22 and 24, best shown in Fig. 2, to comprise a half-together joint, said flanges being cemented together or otherwise secured to comprise a unitary exterior container. By using this method of manufacture, different colored materials may be used respectively for the upper and lower portions, and thus enhance the decorative appearance of the container 10. Further, the joint line afforded by the lower edge of flange 22 for example may comprise a level mark to be used when the exterior container is being filled with water.

The flower pot 14 may be molded from any suitable material such as that from which the exterior container 10 is formed. Synthetic resin forms a highly suitable material from which the flower pot 14 may be molded for example. Preferably, the bottom of the flower pot 14 is provided with an inset portion 26 to provide a recess 28 to accommodate a valve unit to be described hereinafter. Preferably, the inset portion 26 is provided substantially centrally thereof with a cylindrical hole 30.

The water contained in reservoir 10 is introduced into the lower end of the flower pot 14 through a valve unit 32 comprising the principal feature of the present invention. Said valve unit comprises a substantially cylindrical hollow body 34, the upper end of which is closed. Such closed end is provided with a small water inlet hole 36. The other end of the body 34 has an annular radially extending flange 38. The flanged end of the body 34 also is internally threaded as indicated at 40, said threads extending partially along the interior of the body 34. Preferably, an internal chamber 42 is provided within the body 34.

The valve unit also comprises a needle valve member 44 which has external threads 46 thereon, complementary to the internal threads 40 of the body 34. Further, said complementary threads preferably are cylindrical for ease of manufacture and operation of the valve. The outer end of the needle valve member is provided with an operating handle 48, one end of said handle preferably being shaped to provide an indicating point 50. The opposite end of the needle valve member 44 is pointed to provide a needle end 52 which engages the water inlet hole 36 in valve body 34.

The outer face of the flange 38 of the valve body member also is provided with a suitable indicia 54 which, as illustrated in Fig. 6, comprises the notation "wet" and an arrow indicating the direction in which the handle 48 should be turned in order to open the inlet hole 36 to a greater extent and thereby permit a greater amount of water to be drawn into the flower pot 14 from the reservoir 10. Said indicia 54 merely is exemplary and other types of indicia such as graduated numbers or the like may be used in lieu of the indicia which is illustrated.

The valve body 34 preferably is made from a suitable compressible material such as synthetic resin, such resin preferably being rubber-like in physical characteristics. One specific example of synthetic resin which is suitable is polyethylene. However, by mentioning this specific resin, it is not intended that the invention shall be restricted to the use of such resin only. Other relatively soft or compressible resins are available, as well as certain synthetic rubber compositions. Said valve body may conveniently and inexpensively be manufactured by molding the same from the selected material and substantially no finishing of the valve body is required after being molded. For convenience of molding however, the valve body 34 may be bipartite and the several parts be suitably cemented or otherwise connected to form the completed body.

The outer diameter of the cylindrical body 34 which is inserted, preferably frictionally, within the hole 30 in the bottom of the flower pot 14, is slightly larger than the diameter of the hole 30, whereby not only is a frictional fit provided between the body 34 and the pot 14 for watertight purposes, but, after the body 34 is inserted into the hole 30 until the flange 38 abuts the inset portion 26 of the pot, the body 34 will expand slightly as shown in exaggerated manner in Fig 4 so as somewhat to form a locking flange 56. This arrangement securely anchors the valve unit 32 to the bottom of the pot 14. However, if desired for any purpose, the valve unit may be removed from the pot 14 by preferably first removing the needle valve member 44 and then prying the flange 38 from the bottom of the pot to remove the body portion 34 therefrom.

In order that water may pass from the lower part of reservoir 10 into the pot 14 through the needle valve hole 36, said water must pass into the internal chamber 42 of the valve unit. Such passage is afforded by preferably axially extending openings or channels 58 which are best shown in Fig. 5. Said channels 58 are deeper than the root depths of the threads 40, whereby even when the needle valve member 44 is inserted in the body 34 of the valve unit, the passages 58 remain open, notwithstanding the fact that said channels interrupt the threads 40. However, even though a plurality of the channels or passages 58 are provided, ample areas remain in the threads 40 to engage the external threads 46 on the needle valve member 44.

In the event for example the pot 34 should become broken and a new pot is obtained to replace the same, the valve unit 32 may be used with the new pot and thus save the expense of purchasing a new valve. Further, said valve unit may be utilized with existing flower pots not provided with valve arrangements in the bottom thereof. Hence, it is conceivable that the valve unit 32 may be merchandised as a separate item from the entire flower pot assembly.

In using the present invention, it is conceivable that suitable protecting means may be desired directly above the inner end of the valve unit 32, especially to prevent particles of soil or otherwise from entering the small water inlet holes 36 of the valve unit. This easily is accomplished however by using any suitable type of non-corroding or other material which will not be deleterious to plant growth. Rock wool for example, comprises a suitable substance.

Further, it is preferred that the needle valve member 44 be made from a suitable material which is non-corrosive or injurious to plant growth. This member for example may be molded from synthetic resin or manufactured on a screw machine or the like from suitable metal such as stainless steel. Further, when the needle valve member 44 is inserted into the threads 40 of the valve body 34, the compression of the valve body as a result of being frictionally inserted in the hole 30 will result in providing ample frictional engagement between the threads 40 and 46, whereby any desired setting of the valve easily is achieved and maintained.

Another embodiment of the invention is illustrated in Figs. 7 through 11, this embodiment of the invention not requiring the removal of the interior flower pot from the exterior container when it is desired to adjust the movable member of the water inlet valve. Rather, it is only necessary to manually rotate the projecting upper rim of the interior flower pot about its axis relative to the exterior container in order to effect adjustment of the valve. Certain changes in details of the valve components, as well as the manner in which the valve unit is inserted in the bottom of the interior flower pot also comprise advantageous features incorporated in this additional embodiment.

By referring to Fig. 7, it will be seen that the exterior container 60 is similar to exterior container 10 of the embodiment shown in Figs. 1 through 6, except for one addition to be described hereinafter. The interior of flower pot 62 preferably is circular in cross-section so as to be complementary to the opening 64 formed in the top of exterior container 60. The upper end of pot 62 has an annular, radially extending outer flange 66 which rotatably and slidably abuts the rim of the opening 62 of container 60. By this means, the flower pot 62 is supported within the exterior container 60 so that the bottom 68 of the flower pot 62 preferably is spaced a limited distance above the bottom 70 of exterior container 60, as clearly shown in Figs. 7 and 9.

The bottom 68 of the flower pot 62 preferably is substantially flat, as distinguished from having an inset portion 26 as in the embodiment of Figs. 1 through 6, and is provided with a central, preferably circular hole 72 through which the outer body 74 of valve unit 76 projects. As in regard to the embodiment shown in Figs. 1 through 6, the outer body 74 of valve unit 76 preferably is formed from suitable material which is compressible to a limited extent such as synthetic resin of a non-rigid type, of which polyethylene is one example. Certain rubber compositions, preferably of a synthetic nature, also are suitable for this purpose.

In order that the valve unit 76 need not be of a very large size, the outer body 74 has an upper portion 78 which merges with a radial flange 80, the latter being integral with a larger cylindrical portion 82 that terminates in another radial flange 84. The outer diameter of larger cylindrical portion 82 is greater than the outer diameter of upper portion 78 of the valve body 74. However, the hole 72 formed in the bottom 68 of flower pot 62 is preferably of a slightly smaller diameter than the outer diameter of cylindrical portion 82 of the valve body, whereby when the valve unit is inserted through hole 72, the outer wall surfaces of cylindrical portion 82 are complementarily compressed so as to effect firm frictional engagement between the valve housing and the perimeter of hole 72, as illustrated in exemplary detail in Fig. 9. Movement of the valve body 74 through hole 72 is arrested by the engagement of flange 84 with the undersurface of bottom 68 of flower pot 62 as clearly shown in Figs. 7 and 9.

The interior of upper portion 78 of valve body 74 is hollow to provide an interior cavity 86, the walls of the lower portion of which, as viewed in Fig. 9, are provided with internal threads 88. The upper end of cavity 86 terminates in a needle valve discharge opening 90 through which water enters the interior of flower pot 62.

The inner surfaces of flange 80 and cylindrical portion 82 define a cylindrical recess 92 which extends upwardly from flange 84 to receive the outer, preferably cylindrical head 94 of a needle valve member 96. The upper end 98 of the member 96 comprises the needle end of the valve member, said needle end cooperating with discharge opening 90 of valve body 74 to comprise the complete needle valve portion of the valve unit 76.

The intermediate portion of the needle valve member 96 is externally threaded complementarily to the internal threads 88 of the valve body 74, the elasticity of the material from which body 74 is formed permitting snug engagement of the exterior surfaces of the threads of valve member 96 with the interior threads 88 and thereby prevent any appreciable leakage of water between said internal and external threads. Further, such frictional engagement serves to maintain a desired setting between the needle valve member 96 and the valve body 74.

The outer end of cylindrical head 94 is provided with a concave depression 100 which, in cross-section, is somewhat star or cross-shaped, as shown in Fig. 11. The upper end of said depression 100 communicates with a vertical or axial central hole 102. The upper end of the central hole 102 communicates with one or more transverse outlet openings 104 in the needle end 98 of valve member 96. The openings 104 permit water to pass from the lower portion of exterior container 60 through depression 100 into central hole 102 and from there through openings 104 into interior cavity 86. From the cavity 86, the water passes through discharge openings 90 into the interior of flower pot 62.

Preferably integral with and extending upwardly from the upper surface of bottom 70 of exterior container 60 is a projection 106 which is substantially complementary to the concave depression 100 in the head 94 of valve member 96. In cross-section, projection 106 is generally complementary in shape to the cross-section of depression 100 as substantially shown in Fig. 11. Preferably, the projection 106 comprises four radially extending ribs 108, the outer surfaces of which are rounded downwardly and outwardly as shown in Fig. 9. Such rounded outer surfaces however are only complementary to the adjacent surfaces of depression 100 but are preferably spaced therefrom in order to provide curved passages 110 through which water passes between projection 106 and the walls defining depression 100 in the valve head 94. Also, as best shown in Fig. 11, there is substantial clearance between the surfaces of depression 100 and the surfaces on projection 106 between the ribs 108, thereby insuring adequate passage for water at all times between the projection 106 and central hole 102.

Due to the fact that the projection 106 is stationary relative to the exterior container 60, and the ribs 108 of projection 106 are received within the cross-shaped inner surface of depression 100, only very limited relative rotation may take place between projection 106 and head 94 of the valve member 96 before certain surfaces of these members will abut each other, whereby continued rotation of flower pot 62 about its vertical axis relative to exterior container 60 will result in rotational movement of valve member 96 relative to the valve body 74. Such adjustment of the valve member 96 relative to the body 74 will result in opening or closing the space between the needle end 98 of the valve member and the discharge opening 90 of the valve body 74, such movement being between completely closed and substantially fully opened position. The latter will occur when the inner surfaces of depression 100 firmly abut the exterior surfaces of projection 106. Any further relative rotation between the flower pot and exterior container will result in the flower pot being slightly raised relative to the exterior container but no harm will occur if this should take place. Even when the valve member is moved to such substantially fully opened position, ample water will be able to pass between the depression 100 and plug 106.

If desired, suitable indicia such as an arrow 112 may be formed upon the outer flange 66 as shown in Fig. 7, to indicate the direction within which the flower pot 62 should be turned relative to exterior container 60 so as to open the valve more fully and thereby create a wetter condition within the flower pot 62.

As in the embodiment shown in Figs. 1 through 6, if desired, rock wool or other similar material may be placed over the upper portions 78 of valve body 74 to prevent soil particles and the like from entering the discharge opening 90 of the valve unit, thereby interfering with the desired adjustment of the valve for controlled passage of water therethrough. Further, the valve member 96 preferably is made from non-corroding materials such as bronze, brass, aluminum, or the like, as long as the material is not harmful to the growth of plants within the flower pot 62.

It will be understood in regard to both embodiments of the invention that the amount of water required to pass through the needle valve units thereof will be relatively small since it is only necessary to maintain the soil within the flower pots moist to a desired degree. The head of water within the outer containers will induce flow of water through the needle valves, in conjunction with the capillary action of the soil per se.

From the foregoing, it will be seen that the present invention comprises several embodiments of self-watering flower pot assemblies which are relatively inexpensive to manufacture and easy to assemble. The operation is fool-proof and a wide range of watering capacities are possible with the use of the needle valve units provided respectively in said several embodiments. Any required amount of water for an individual plant may be attained continuously and indefinitely, merely by keeping the reservoir comprising the outer container of both embodiments, filled to a desired degree with water. In the second described embodiment, it is not necessary to remove the interior flower pot from the exterior container in order to effect adjustment of the valve member, but only relative rotation between the flower pot and exterior container is necessary in the desired direction.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:
1. A self-watering flower pot assembly comprising in combination, an exterior container to serve as a water reservoir and having an open top, an interior flower pot having a hole in the bottom thereof and suspended into said container through the open top thereof, and a water inlet valve unit mounted within and extending through said hole in the bottom of said flower pot, said valve unit comprising a valve jacket having a water inlet opening in one end and a valve member movably carried by said jacket and operable to open said hole variable amounts and also close it, whereby the amount of water drawn from said reservoir through said inlet hole and into the flower pot may be regulated as desired, said jacket having at least a yieldable portion of larger cross-sectional dimension than that of the hole in the bottom of said interior flower pot, whereby said valve jacket may be press-fitted thereinto in water-tight relationship with the walls of said hole to secure said valve assembly to said flower pot.

2. The flower pot assembly set forth in claim 1 further characterized by the valve jacket of said valve unit being an internally threaded cylinder extending through said hole, said jacket also having a radial flange at the end opposite that end having the water inlet hole therein and said flange abutting the bottom surface of said flower pot to position the valve jacket relative thereto.

3. A self-watering flower pot assembly comprising in combination, an exterior container to serve as a water reservoir, an interior flower pot suspended into said container through an opening in the top thereof and supported by said container, a water inlet valve mounted within a hole in the bottom of said flower pot, said valve comprising a hollow body having a water outlet opening discharging into the interior of said flower pot and a valve member having a portion adjustably movable relative to said outlet opening to vary the amount of water passing therethrough, and means on said exterior container engageable with said valve member and operable upon relative rotational movement between said flower pot and exterior container to vary the outlet opening of said water inlet valve.

4. The self-watering flower pot assembly of claim 3 further characterized by said means on said exterior container comprising a projection extending upwardly from the bottom thereof and engageable with a complementary recess in said valve member.

5. The self-watering flower pot assembly of claim 4 further characterized by said valve member having a head on the lower end thereof provided with a recess extending upwardly thereinto receiving and engageable with the projection extending upwardly from the bottom of said exterior container.

6. The self-watering flower pot assembly set forth in claim 5 further characterized by said recess in the head of said valve member and said projection on said exterior container being irregular in cross-section and loosely complementary, thereby providing a water passageway therebetween at all operative positions of adjustment of said valve member.

7. The self-watering flower pot assembly of claim 3 further characterized by said valve member having a water inlet opening extending centrally upwardly from the bottom thereof and communicating at the upper end thereof with the water outlet opening of said valve body to permit passage of water from the bottom portion of said exterior container with the interior of said flower pot when said valve is open.

8. The self-watering flower pot assembly of claim 3 further characterized by the lower surface of the bottom of said flower pot being substantially flat and said valve body having a radially extending flange on the perimeter thereof engaging said lower surface of said flower pot when the valve is mounted therein to position the valve body relative to said flower pot.

9. The self-watering flower pot assembly of claim 3 further characterized by said valve body having an annular recess in the lower end thereof and said valve member having a head on the lower end thereof received within said recess.

10. The self-watering flower pot assembly set forth in claim 3 further characterized by the upper end of said flower pot having a radially extending annular shoulder thereon rotatably and slidably engaging the rim of the upper end of said exterior container adjacent the opening therein to support said flower pot, the length of said flower pot being such as to space the bottom thereof from the bottom of said exterior container to permit water to pass readily to said valve.

References Cited in the file of this patent
UNITED STATES PATENTS

| | | |
|---|---|---|
| 608,590 | Freund | Aug. 9, 1898 |
| 1,231,976 | Weitzel | July 3, 1917 |
| 1,815,676 | Medveczky | July 21, 1931 |
| 1,848,691 | Beach | Mar. 8, 1932 |
| 2,761,424 | Hopkins | Sept. 4, 1956 |